US009207638B2

(12) United States Patent
Dubois et al.

(10) Patent No.: US 9,207,638 B2
(45) Date of Patent: Dec. 8, 2015

(54) OFF-AXIS INTERFEROMETER

(75) Inventors: Frank Dubois, Brussels (BE);
Catherine Yourassowsky, Brussels (BE)

(73) Assignee: UNIVERSITE LIBRE DE BRUXELLES, Brussels (BE)

( * ) Notice: Subject to any disclaimer, the term of this patent is extended or adjusted under 35 U.S.C. 154(b) by 0 days.

(21) Appl. No.: 13/498,299

(22) PCT Filed: Oct. 5, 2010

(86) PCT No.: PCT/EP2010/064843
§ 371 (c)(1),
(2), (4) Date: Mar. 26, 2012

(87) PCT Pub. No.: WO2011/042442
PCT Pub. Date: Apr. 14, 2011

(65) Prior Publication Data
US 2012/0200901 A1 Aug. 9, 2012

(30) Foreign Application Priority Data

Oct. 8, 2009 (EP) ..................................... 09172561
Jan. 12, 2010 (EP) ..................................... 10150524

(51) Int. Cl.
*G02B 5/32* (2006.01)
*G02B 21/00* (2006.01)
*G02B 5/18* (2006.01)
*G01B 9/021* (2006.01)
*G03H 1/08* (2006.01)
*G03H 1/02* (2006.01)
*G03H 1/04* (2006.01)
*G03H 1/00* (2006.01)

(52) U.S. Cl.
CPC ................. *G03H 1/08* (2013.01); *G02B 21/00* (2013.01); *G03H 1/02* (2013.01); *G03H 1/0443* (2013.01); *G03H 2001/005* (2013.01); *G03H 2001/0212* (2013.01); *G03H 2001/0456* (2013.01); *G03H 2222/13* (2013.01); *G03H 2222/18* (2013.01); *G03H 2222/23* (2013.01); *G03H 2222/24* (2013.01)

(58) Field of Classification Search
None
See application file for complete search history.

(56) References Cited

U.S. PATENT DOCUMENTS

| 6,525,821 | B1 | 2/2003 | Thomas et al. |
| 7,298,532 | B2 * | 11/2007 | Thomas et al. ................... 359/9 |
| 7,362,449 | B2 * | 4/2008 | Dubois et al. ................. 356/515 |
| 7,463,366 | B2 * | 12/2008 | Dubois et al. ................. 356/520 |

FOREIGN PATENT DOCUMENTS

| EP | 1 399 730 | 3/2004 |
| EP | 1 631 788 B1 | 3/2007 |
| WO | WO 03/002972 A2 | 1/2003 |

OTHER PUBLICATIONS

Dubois et al., "Applications of digital holographic microscopes with partially spatial coherence sources," *Journal of Journal of Physics: Conference Series* (2008) vol. 139, 012027: 1-6. XP002578564.

(Continued)

*Primary Examiner* — Jade R Chwasz
(74) *Attorney, Agent, or Firm* — Merchant & Gould P.C.

(57) ABSTRACT

An Interferometer for off-axis digital holographic microscopy includes a recording plane, and a grating located in a plane optically conjugated with the recording plane. The grating defining a first and a second optical path, the optical path corresponding to different diffraction order.

14 Claims, 4 Drawing Sheets

(56) References Cited

OTHER PUBLICATIONS

Dubois et al., "Improved three-dimensional imaging with a digital holography microscope with a source of partial spatial coherence," *Applied Optics* (1999) 38 (34): 7085-7094.
Paturzo et al., "Resolution-enhanced approaches in digital holography," *Optical Measurement Systems for Industrial Inspection VI* (2009) 7389: 738905-1-738905-12. XP007912135.
Takeda et al., "Fourier-transform method of fringe-pattern analysis for computer-based topography and interferometry," *J. Opt. Soc. Am.* (1982) 72 (1): 156-160.
Yamaguchi et al. "Phase-shifting digital holography," *Optics Letters* (1997) 22 (16): 1268-1270.
International Search Report (Form PCT/ISA/210) for corresponding International Application No. PCT/EP2010/064843.
Written Opinion (Form PCT/ISA/237) for corresponding International Application No. PCT/EP2010/064843.

* cited by examiner

OFF-AXIS INTERFEROMETER

This application is a National Stage Application of PCT/EP2010/064843, filed 5 Oct. 2010, which claims benefit of Serial No. 10150524.6, filed 12 Jan. 2010 in the EPO, and which also claims benefit of Serial No. 09172561.4, filed 8 Oct. 2009 in the EPO, and which applications are incorporated herein by reference. To the extent appropriate, a claim of priority is made to each of the above disclosed applications.

FIELD OF THE INVENTION

The present invention is related to an off-axis interferometer and its use in an apparatus as well as to a method for off-axis digital holographic microscopy.

STATE OF THE ART

In prior art interferometers, an incident light beam is usually split into an object beam and a reference beam and then recombined onto a recording plane where the object beam and the reference beam interfere, producing interference fringes. The objective of such devices is the measurement of the complex amplitude of the light (i.e. phase and amplitude information).

Generally, the light used in such measurement has a high coherency, such as the light produced by lasers. This has several drawbacks, such as the appearance of coherent noise (speckle field) and the high cost associated with highly coherent light sources.

In many cases, a small angle is introduced between the object beam and the reference beam in order to obtain low frequency spatially heterodyne fringes such as disclosed in U.S. Pat. No. 7,002,691. These kinds of configurations are generally called off-axis configurations due to the non-zero angle between the interferometer axis and one of the interfering beams.

In such off-axis configuration a highly coherent incident light is compulsory to observe interference: if the path length differences between the reference beam and the object beam are larger than the coherence length of the incident beam, no interference can be observed, and the phase information is lost.

This means that, for temporally partially coherent light, the difference in path length at different positions in the recording plane introduced by the small angle can be sufficient to disrupt the coherency, so interferences will only be observed in part of the recording plane, in which the coherency is maintained.

The recording of phase and amplitude (or complex amplitude) information is the basis of holography in general, and more specifically of digital holographic microscopy (DHM). In DHM, a hologram is recorded with a CCD camera and the reconstruction of a three-dimensional model of the observed sample is performed by a computer. The hologram is obtained by the use of an interferometer. This procedure provides an efficient tool for refocusing, slice-by-slice, the depth images of thick samples. DHM allows for obtaining quantitative phase contrast imaging with numerous applications as the observation of biological samples. The depth reconstruction capability makes DHM a powerful tool for the implementation of 3D velocimetry. As digital holography provides the complex amplitude, powerful processing methods have been implemented, such as automated refocusing, aberration compensation, 3D pattern recognition, segmentation and border processing.

The principle of digital holography, with separated object beam and reference beam, consists in extracting the complex amplitude information of an object beam from the recorded interference patterns between the object beam and a reference beam. The complex amplitude can then be processed for computing digital refocusing and for performing quantitative phase contrast imaging. There are two main types of configuration: On-line configuration and Off-axis configurations.

The complex amplitude is generally obtained by using an interferometer such as a Mach-Zehnder or a Michelson interferometer.

In On-line configurations, as disclosed by I. YAMAGUCHI ET AL. in "Phase-shifting digital holography", Opt. Lett. 22, 1268-1270 (1997), the angle between the reference and the object beams incident on the camera sensor is as small as possible. The computation of the complex amplitude needs a phase stepping method where several interferometric images are recorded with small optical path changes introduced between the object and reference beam. The optical phase information is computed by implementing the several interferometric images into a formula.

The main disadvantage of the on-line configuration is the need for sequentially recording several interferometric images that limits the acquisition speed due to the camera frame rate. Indeed, the object has to remain static during the complete acquisition that takes the time of several frames recording.

In Off-axis configuration, such as disclosed in U.S. Pat. No. 6,525,821 and by TAKEDA ET AL. in "Fourier-transform method of fringe-pattern analysis for computer-based topography and interferometry," J. Opt. Soc. Am. 72, 156-160 (1982), there is a non-zero mean angle between the object and reference beams that enables the complex amplitude computation from only one recorded interferometric image. With respect to the on-line configuration, this is a decisive advantage for the analysis of rapidly varying phenomena. However, the use of a Mach-Zehnder or a Michelson interferometer in those configurations requests an optical source of high temporal coherence. Otherwise, the fringe modulation is not constant due to variable optical delays over the field of view between the object and reference beams.

As disclosed by DUBOIS ET AL. in "Improved three-dimensional imaging with digital holography microscope using a partial spatial coherent source" Appl. Opt. 38, 7085-7094 (1999) the use of partially coherent illumination improves the quality of the holographic recording by decreasing the coherent artefact noise. In transmission, the most effective noise reduction is obtained by using spatial partial coherent illumination. This type of illumination is obtained by decreasing the coherence properties of a laser beam, or by increasing the spatial coherence of an incoherent source as a Light Emitting Diode by an optical filtering system.

With the usual set up used to reduce the spatial coherence of a laser, the laser beam is focused close to a moving ground glass. For a given position of the ground glass, the transmitted light through the sample is a speckle field. When the ground glass is moving, and supposing the exposure time is long enough to obtain an averaging effect, it can be shown that this type of source is equivalent to a spatial partial coherent light source of which the spatial coherence distance is equal to the average speckle field. This method for preparing the source keeps a high degree of temporal coherence that enables the off-axis method. However, illumination fluctuations arise when short exposure times are requested. In practice, it is difficult to achieve fast enough moving ground glass so as to record dynamical object requiring short exposure time.

With the set up that increases the spatial coherence of an incoherent source or non-laser source, the temporal incoherence properties are maintained. In such case, it is not possible to implement the Off-axis configuration nor is it possible to record the full complex amplitude information in one single frame.

Regarding the positioning of samples, two main types of configurations can be defined: differential configuration, as disclosed in EP 1631788, wherein the sample is located in front of the interferometer, and classical configuration as defined in EP 1399730, wherein the sample is located in one arm of the interferometer.

In the article "resolution-enhanced approaches in digital holography" (Optical Measurement ystems for Industrial inspection VI, Proc. Of SPIE, Vol. 7389, 738905-1) Paturzo et Al. discloses a device wherein a grating is used to enhance resolution. In the disclosed setup, several diffracted optical paths are used to increase the numerical aperture of the optical system. Those different diffracted optical path are hitting the recording plane off-axis, but, the spatial and temporal coherence is not maintained. This means that, as will be explained in the detailed description of the invention, a light intensity pulse in the form of a Dirac delta in the object plane will not reach the entire recording plane simultaneously for all optical paths. So, in case of incoherent light source, the phase information will be lost in some part of the recording plane.

AIMS OF THE INVENTION

The present invention aims to provide an interferometer that overcomes the drawbacks of prior art interferometers.

More specifically, the present invention aims to provide an off-axis interferometer able to work with partially coherent light sources.

The present invention also aims to provide digital holographic microscope (DHM) configurations, which enable the use of the off-axis configurations either with partial temporal and/or with spatial coherent source. This results in the capability to implement fast colour digital holographic recording at very low noise levels.

The present invention further aims to provide digital holographic microscopes that enable the use of partial coherent sources created from an incoherent source with the off-axis configuration. It is a significant improvement as it allows operating the microscope in fast mode without the disadvantage of fluctuations resulting from the configuration with a laser (coherent noise). Moreover this implementation enables the use of low cost sources as LED and gives the possibility to record simultaneously red-green-blue holograms to provide full colour digital holographic microscopy without the coherent noise.

SUMMARY OF THE INVENTION

A first aspect of the invention is related to an interferometer for off-axis digital holographic microscopy, said interferometer comprising:
- a recording plane perpendicular to an optical axis of the interferometer;
- optical means defining a first optical path and a second optical path incident on said recording plane, and said first and second optical paths being non-parallel, said optical means being characterised in that temporally partially coherent light beams propagating along said first and second optical paths are able to interfere and produce a fringe contrast that is independent of the position on the recording plane.

By off-axis, it is meant that at least one of the interfering light beams has a non-zero angle with regard to the interferometer axis, or equivalently, that the interfering light beams are non-parallel.

According to particular preferred embodiments, the interferometer of the present invention further discloses at least one or a suitable combination of the following features:
- said optical means comprises a grating optically conjugated with said recording plane for producing diffracted light beams;
- the grating is selected from the group consisting of Ronchi grating, blazed diffraction grating and thick phase holographic grating;
- the optical means further comprises a first lens, said grating being located in the back focal plane of said first lens;
- the optical means comprises a second lens, the grating being located in the front focal plane of said second lens;
- the interferometer further comprises a third lens optically coupled to said second lens and the recording plane being located in the back focal plane of said third lens;
- the interferometer further comprises a wedge located in at least one of the first and second optical paths for inducing a shift of the pattern produced by a light beam propagating on the at least one of the first and second optical paths on the recording plane for producing differential interfering fringe pattern;
- the interferometer further comprises an optical stop for stopping excess diffracted light beams.

By two planes optically conjugated in an optical system, it is meant that one of the plane is the optical image of the other one.

Alternatively, an interferometer for off-axis digital holographic microscopy of the present invention comprises:
- a recording plane;
- a grating located in a plane optically conjugated with said recording plane, said grating defining a first and a second optical path, said optical path corresponding to different diffraction order.

A grating having a periodicity of d splits an incident beam into several beams fulfilling the condition:

$$d(\sin \theta_m + \sin \theta_i) = m\lambda$$

wherein $\theta m$ is the angle between the diffracted light beam and the grating normal, $\theta i$ is the angle between the incident light beam and grating normal, $\lambda$ is the light wavelength and m is an integer called "diffraction order". The light that corresponds to direct transmission (or specular reflection in the case of a reflection grating) is called the zero order, and is denoted m=0. The other light beams occur at angles which are represented by non-zero integers m. Note that m can be positive or negative, resulting in diffracted orders on both sides of the zero order beam.

Preferably, said interferometer further comprises a first lens, said grating being located in the back focal plane of said first lens.

Advantageously, said interferometer further comprises a second lens, the grating being located in the front focal plane of said second lens.

Preferably, said interferometer further comprises a third lens optically coupled to said second lens, said recording plane being located in the back focal plane of said third lens;

Preferably, the interferometer further comprises a wedge located in at least one of the first and second optical paths for inducing a shift of the pattern produced by a light beam propagating on the at least one of the first and second optical paths on the recording plane for producing differential interfering fringe pattern.

Advantageously, said interferometer comprises an optical stop able to stop, in use, excess light beams produced by the grating.

A second aspect of the invention is related to a digital holographic microscope comprising:
- an interferometer as described here above;
- a microscope objective;
- an object cell able to hold a specimen to be studied located in a front focal plane of said microscope objective and said object cell being optically conjugated with said recording plane;
- a partially coherent light source able to produce a first partially coherent light beam.

According to particular preferred embodiments, the digital holographic microscope of the present invention further discloses at least one or a suitable combination of the following features:
- the object cell is illuminated by the first light beam, said microscope objective being located in front of the interferometer
- the digital holographic microscope further comprises:
    - a Mach-Zehnder interferometer comprising a first beam splitter and a second beam splitter, said first beam splitter being able to split said first light beam into a second light beam and a third light beam;
    - a first lens, located in the optical path of said third light beam, for focusing said third light beam on said grating;
    - a second lens having the same optical axis as the first lens and located at focal distance of the grating for producing at least one non-zero order diffracted light beam, and said second beam splitter being arranged for recombining said second light beam and said diffracted light beam into a recombined beam;
    - an optical stop for stopping the zero order diffracted light of said third light beam;
    - recording means capable of recording interferometric signals produced by the interaction between the second light beam and the diffracted light beam, said recording means being located in the recording plane of said interferometer;
    - focusing means for focusing said recombined beam onto said recording means, the first lens, second lens and the grating forming an interferometer as described here above, and the optical pathway of the second and third light beam being essentially equivalent (except for the grating and the optical stop);
- the sample holder and microscope objective are located in front of the first beam splitter, defining a differential holographic configuration;
- the sample holder and microscope objective are located in the optical path of the second light beam.
- a second microscope objective is located in the optical path of the third light beam;
- the digital holographic microscope further comprises compensating means for equalizing the optical path of the second light beam and the third light beam;
- said compensation means comprise means for compensating the sample holder, and/or two lenses for compensating the first lens and second lens;
- the digital holographic microscope further comprises a third beam splitter located on the second light beam pathway for illuminating a reflecting object and a fourth beam splitter located on the third light beam pathway for illuminating a reference mirror, defining a Mach-Zehnder geometry;
- the partially coherent light source comprises illumination means selected from the group consisting of a LED, a gas discharge lamp and a pulsed laser;
- the partially coherent light source comprises a thermal light source, preferably filtered to reduce its spectral width;
- the partially coherent light source further comprises a first illumination lens, a pinhole in a screen and a second illumination lens for producing a partially coherent light beam;
- said recording means are colour sensitive recording means, and the light source simultaneously produces at least three separate wavelengths for recording colour holographic interferogram, preferably, the separate wavelengths are corresponding to Cyan Magenta and Yellow (CMY) or Red Green Blue (RGB) for colour reconstruction;
- said light source comprises at least three LEDs of different wavelengths;
- the digital holographic microscope further comprises a fluorescence excitation source optically coupled to said sample holder
- the digital holographic microscope further comprises a barrier filter to avoid the transmission of light originating from the excitation source to reach the recording plane.

By "essentially equivalent" it is meant that the optical path of the second and third light beams induce a phase shift of less than the coherence length of the light source. This can be obtained by equalizing the optical path lengths, and by introducing the same optically active elements at the same distance from the light source on both paths, except for the grating, the optical stop, and eventually, the object to be observed.

A third aspect of the invention is related to a method for producing a fringe contrast between two non-parallel temporally partially coherent light beams, said method comprising the steps of:
- providing an incident light beam, said incident light beam being temporally partially coherent,
- focusing said incident light beam on a grating for producing at least two diffracted light beams,
- focusing said diffracted light beams to the infinite for obtaining parallel diffracted light beams parallel to the incident light beam,
- focusing said parallel diffracted light beams on said recording plane, producing fringe contrast independent of the position in the recording plane.

The diffracted light beams can be zero-order or non-zero order diffracted light beams, the non-zero order light beam producing the off-axis light beam.

A fourth aspect of the invention is related to a method for recording off-axis digital holograms comprising the steps of:
- providing a partially coherent light source producing a first partially coherent light beam,
- splitting the first partially coherent light beam into a second light beam and a third light beam,
- focusing the third light beam on a grating for splitting said third light beam into a non-zero order diffracted light beam and a zero order diffracted light beam,
- focusing the non-zero order diffracted light beam and zero order diffracted light beam to the infinite in order to obtain parallel and spatially separated non-zero diffracted light beam and zero order diffracted light beam,
- stopping the zero order diffracted light beam,
- combining the non-zero diffracted light beam with the second light beam into a recombined beam, focusing the recombined beam on recording means to obtain an off-axis interferogram.

FIGURE KEYS

Figure 1:
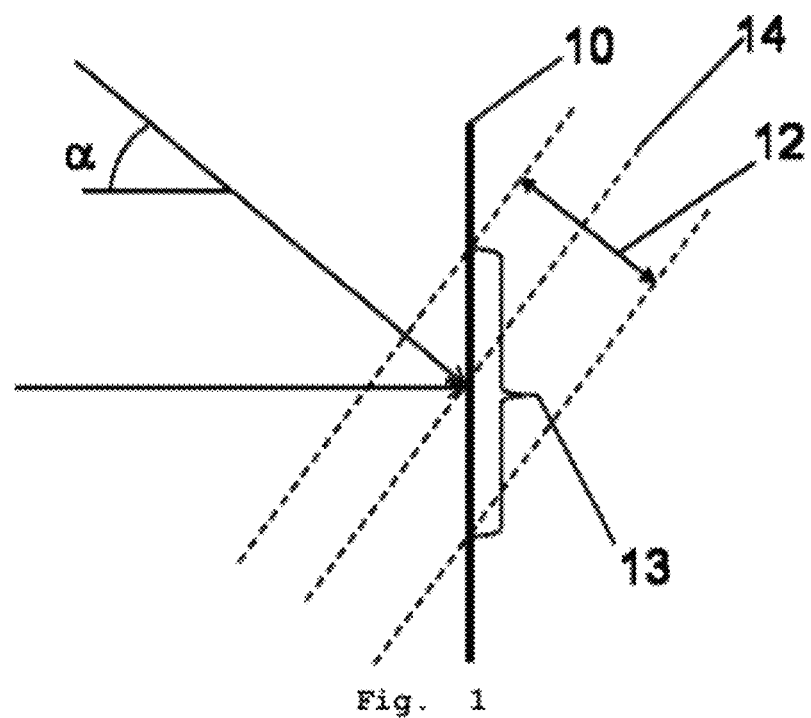
FIG. 1 illustrates the limitation of coherency between two secant interfering beams in plane.
Figure 2:
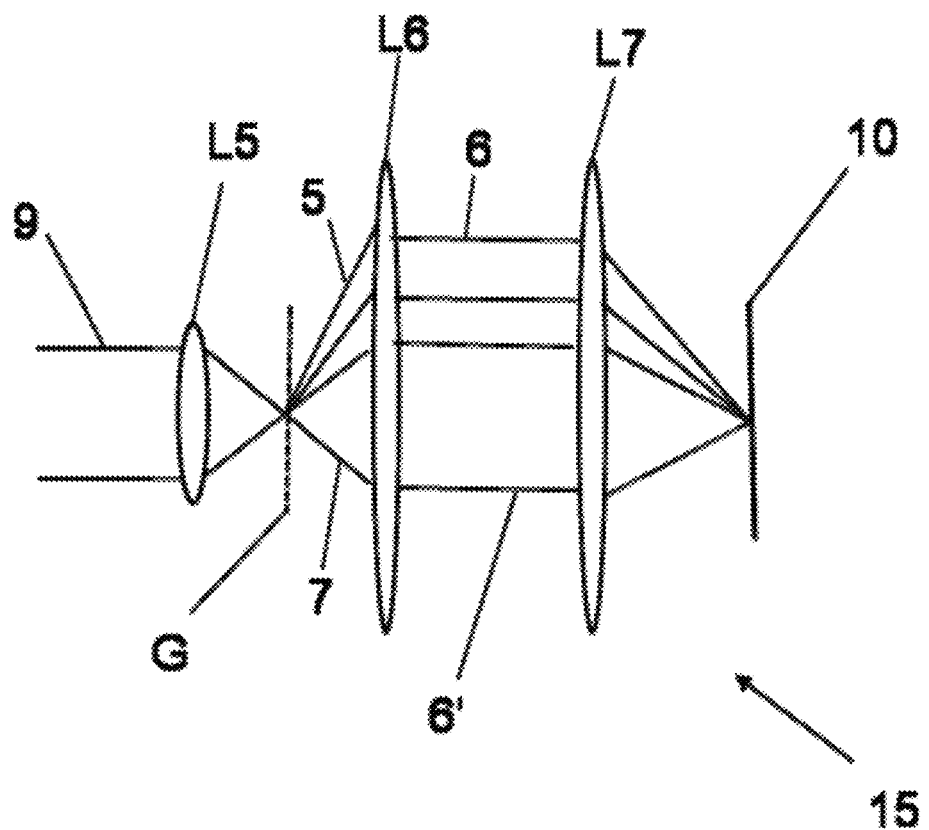
FIG. 2 represents an interferometer according to the present invention.

1. First light beam
2. Second light beam
3. Third light beam
4. Recording means
5. Diffracted light beam (non-zero order diffraction)
6. Non-zero order diffracted parallel light beam
6'. Zero order diffracted parallel light beam
7. Non-diffracted light beam (or zero order diffraction)
8. Optical stop
9. Incident light beam
10. Recording plane
11. Compensating means for compensating wedge
12. 2*Coherence length
13. Interference area
14. Coherence plane
15. Interferometer of the invention
16. Reference mirror
17. fluorescence excitation light source
Bs1, Bs2, Bs3 and Bs4: Beam splitters
EF: excitation filter
G: Grating
L1, L2, L3, L4, L5, L6 and L7: lenses
Ml1 and Ml2: microscope objectives
M1, M2 and M3: mirrors
P: pinhole in a screen
Sa: transmission sample or sample holder
SF: spectral filter
So: Illumination source
RA: rotation assembly
Rs: reflecting sample or sample holder
W: Wedge

DETAILED DESCRIPTION OF THE INVENTION

In interferometry, when using partially coherent light, it is of key importance to maintain the coherence of the incident light in a recording plane to observe interference fringes. In many cases the interference fringes are obtained by splitting a first (incident) light beam into a second and third light beam, and recombining the third and second light beam with a small angle introduced between them.

In that case, the small coherence length of the partially coherent incident light (the light to be analysed) introduces a strong limitation: the coherence plane of both beams being non-parallel, they can only interfere in a small area at the intersection between both planes, no interference being observed when the distance between the coherences planes is larger than the coherence length.

This is illustrated in FIG. 1 wherein a light beam perpendicular to a plane is interfering with another, non parallel light beam having an off-axis a from the plane. As represented, the non parallel light is only coherent (able to interfere) in the vicinity of the coherency plane 14, at a distance lower than the coherence length 12, defining a limited area 13 wherein interference is observed.

The present invention discloses an interferometer wherein the coherence plane of an interfering light beam is not perpendicular to the propagation direction of the light beam in the vicinity of a recording plane. This results in the ability of the non-perpendicular light beam to interfere with a perpendicular light beam and produce a fringe contrast that is independent of the position on the recording plane. This permits the recording of off-axis interfering fringes (spatially heterodynes fringes) even in the case of light having limited coherence length, such as the light produced by a LED, a gas discharge lamp, . . . .

Using as first (incident) light beam a partial temporal coherent light beam, the second and third light beams in prior art interferometers can only interfere in corresponding zones defined by the coherence length. This means that the difference in optical path length and phase shifting due to optical devices on the optical path between the second and third light beam should remain smaller than the coherence length of the light source.

Temporal coherence is the measure of the average correlation between the values of a wave at any pair of times, separated by time interval τ. It characterizes whether a wave can interfere with itself at a different time. The time interval over which the phase or amplitude vary by a significant amount (hence the correlation decreases by a significant amount) is defined as the coherence time $\tau_c$. At τ=0 the degree of coherence is perfect, whereas it significantly drops at time interval $\tau_c$. The coherence length $L_c$ is defined as the distance the wave travels in time $\tau_c$. The coherence length can be estimated by the formula:

$$L_c = \frac{2\ln(2)}{\pi n} \frac{\lambda^2}{\Delta\lambda}$$

Wherein λ is the light wavelength, Δλ is the spectral width of the source and n is the propagating refractive index. For a typical LED source, this represents some wavelengths to some tens of wavelengths. For example, for a LED having a wavelength of 650 nm and a spectral bandwidth of 15 nm (typical values for commercially available LEDs), the coherence length is about 20λ. This means that the off-axis reference beam cannot have a phase shifting of more than the coherence time, at any place in the recording plane. This also means that the number of fringes induced by the angle difference between the reference beam and the object beam cannot be more than about 20, which is a strong limitation.

The limited coherence time can also arise from the pulse duration of ultra-short pulse laser. Typically, such pulsed laser has pulse duration of several femtoseconds, thus pulse length limited to some wavelength. In that case, the coherence time is equal to the pulse duration. Again, this means that the number of fringes induced by the angle difference between the reference beam and the object beam cannot be more than the number of wavelength representing the pulse length.

Preferably, to avoid this limitation in both cases, the present invention takes advantage of the particular properties of diffraction gratings for producing an off-axis reference beam without disrupting the temporal coherence of the interfering beams in the recording plane.

In the interferometer 15 of the present invention a diffraction grating G is placed in the back focal plane of a lens L5 placed on the optical axes of an incident light beam 9. The grating G induces the splitting of the incident light beam 9 into a diffracted beam 5 (reference) and a non-diffracted light beam 7 (being eventually the object beam). Then, a second lens L6 placed at focal distance of the gratings G, reshape both the diffracted beam and non diffracted beam into beams parallel to the optical axis. L5, L6 and the grating G are selected to obtain behind L6, two light beams spatially separated, a diffracted beam and a non-diffracted light beam. The non-diffracted light beam may either become the object beam or be eliminated by an optical stop. In the latter case, another object beam can be provided by a larger optical structure, as will be described hereafter. The diffracted beam is then recombined with the object beam and focalised by means of an objective lens L7 on a recording plane, the recording plane being located in the back focal plane of L7.

The diffracted beam being parallel to the optical axis of L7, but not centred on this optical axis, L7 will provide an off-axis angle to said diffracted beam.

Alternatively, the interfering light beams can be any pair of diffracted light beams having different diffraction order. For example, the +1 order diffracted light beam can be selected as the reference light beam, and −1 order symmetrical diffracted light beam can be selected as the object beam.

Preferably, an optical stop is used to stop all but two diffracted light beams selected to interfere on the recording plane.

It can be shown that, in such a configuration, the grating does not disturb the temporal coherence of any non-zero order diffracted light beam. The temporal coherence is related to the optical path travel. Therefore, it is equivalent to demonstrate that an optical temporal pulse that illuminates the back focal planes of L5 and L4 at a given time will simultaneously illuminate the entire back focal plane L7.

Considered that a grating G, of which the transparency is defined by g(x,y)=(1+sin Kx)/2, is illuminated by a monochromatic plane wave of amplitude A. Assuming that the couple of lenses L6-L7 is an afocal system (L6-L7 forming a 4f type system), the amplitude in the recording plane is given by:

$$u_v(x, y) = B \exp\left\{j\frac{4\pi v}{c}(f_6 + f_7)\right\} g\left(-\frac{f_6}{f_7}x, -\frac{f_6}{f_7}y\right) \quad (1)$$

in which B is a constant that does not play a significant role, $j=\sqrt{-1}$, v is the optical frequency, c is the speed of light in vacuum, and $f_6$, $f_7$ are the focal lengths of L6 and L7. Calculating the contribution of only one diffracted beam in the recording plane, Eq. (1) becomes:

$$u'_v(x, y) = B' \exp\left\{j\frac{4\pi v}{c}(f_6 + f_7)\right\} \exp\left(-jK\frac{f_6}{f_7}x,\right) \quad (2)$$

in which K=2π/Λ, with Λ being the spatial period of the grating. B' is a constant that does not play an important role.

The illumination by a delta Dirac shaped temporal pulse is obtained by performing the Fourier transformation of Eq. (2):

$$u'_t(x, y) = B'\delta\left(t - \frac{2}{c}(f_6 + f_7)\right) \exp\left(-jK\frac{f_6}{f_7}x\right) \quad (3)$$

in which t is the time, Eq. (3) expresses the fact that a spatially uniform light pulse in the front focal plane of L6 will simultaneously arrive everywhere in the back focal plane of L7 without time interval depending on the position (x,y). The exponential part expresses the fact that the beam is incident to the sensor plane with a slant angle with respect to the optical axis. When the optical paths of the interferometer of the present invention are equalized, it will therefore be possible to record the interference pattern in the entire plane of the sensor between the object and the reference beam. The slant angle of the reference beam provides the off-axis configuration.

As the demonstrated property of said grating is independent of the non-diffracted light beam, the disclosed setup, comprising a grating G located in a plane conjugated with the recording plane 10 can be used in any off-axis setup. This conjugation can be for example obtained by the use of a 4f type system with a grating between the two lenses L5, L6 and a focusing lens L7.

At this stage, it can be noticed that the diffracted beam, now having its coherency plane parallel to the recording plane, can interfere with any light beam having equivalent optical path and having its coherency plane parallel to the recording plane. More particularly, it can interfere with the non-diffracted light beam, but also with other order diffracted light beams, or a light beam passing through another arm of a larger Mach-Zehnder or Michelson interferometer, provided that the optical path does not differ by more than the coherence length of the incident light.

In the off-axis Digital Holographic microscope (DHM) of the present invention, digital holograms are recorded using partially coherent light sources. In order to obtain such partial coherent light sources, incoherent light sources such as LEDs can be used. In order to obtain the partial coherence necessary to observe the interference fringes required to enable determining the phase information of the incoming light, a spatial filter can be used.

Figure 3:
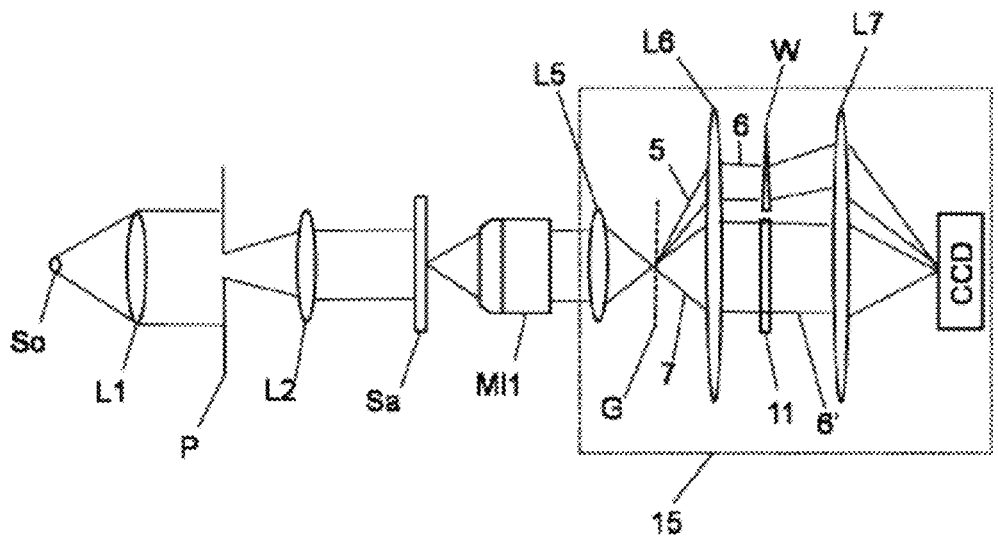
FIG. 3 represents a transmission digital holographic microscope working in differential mode, comprising an interferometer according to the present invention.

A first example of a microscope using an interferometer 15 according to the invention is represented in FIG. 3. In this figure, a partially coherent light source So such as a LED is located in the back focal plane of a lens L1. The produced light beam is then spatially filtered through a pinhole P in a screen in order to increase its spatial coherency. The pinhole P is located in the back focal plane of a lens L2, for illuminating a sample Sa. The sample Sa is located in the back focal plane of the microscope objective ML1 and then follows the interferometer 15 as previously described. The hologram in this figure is recorded by means of a CCD camera.

In the latter case, a wedge W is preferably inserted in the optical path of one of the second or third light beams, in order to induce a slight shift of the images produced by the diffracted and non-diffracted light beams, in order to obtain the differential interferogram as described in EP 1631788, which is incorporated herein by reference. In this case, preferably compensation means 11 are introduced in the optical path of the non-diffracted light beam for compensating the phase shift introduced by the wedge in the diffracted beam.

Alternatively, the interferometer 15 can be introduced in a larger optical structure, such as a Mach-Zehnder interferometer as represented in the DHMs represented in FIGS. 4 to 7. In such case, the non-diffracted light beam 15 is stopped by an optical stop 8 and the object beam is provided by another optical path, for instance another arm of a Mach-Zehnder interferometer.

As is the case with usual holographic microscopes, a first light beam 1 is splitted into a second light beam 2 and a third light beam 3 by means of first beam splitter Bs1, and recombined by a second beam splitter bs2 into a recombined beam, said second and third light beam interfering in the recombined beam, forming an interference pattern on a recording medium, such as a CCD sensor, in order to obtain interference patterns. In such case, the interferometer 15 of the present invention is inserted in the reference arm of the Mach-Zehnder interferometer in order to obtain the off-axis configuration, the non-diffracted beam 6' being stopped by an optical stop 8.

Preferably, the presence of lenses L5 and L6 is compensated by lenses L3 and L4 on the object beam path in order to compensate the phase modification induced by said lenses L5 and L6.

Preferably, the lens L7 is placed after the beam splitter BS2 of the Mach-Zehnder interferometer, used for recombining the object and reference beam. This permits sharing said lens L7 between the object and reference beam.

Alternatively, the lens L7 can be replaced by two lenses located respectively in the optical path of the reference beam and on the optical path of the object beam, both lenses focusing on the recording means, but being located before the recombination means.

Figure 7:
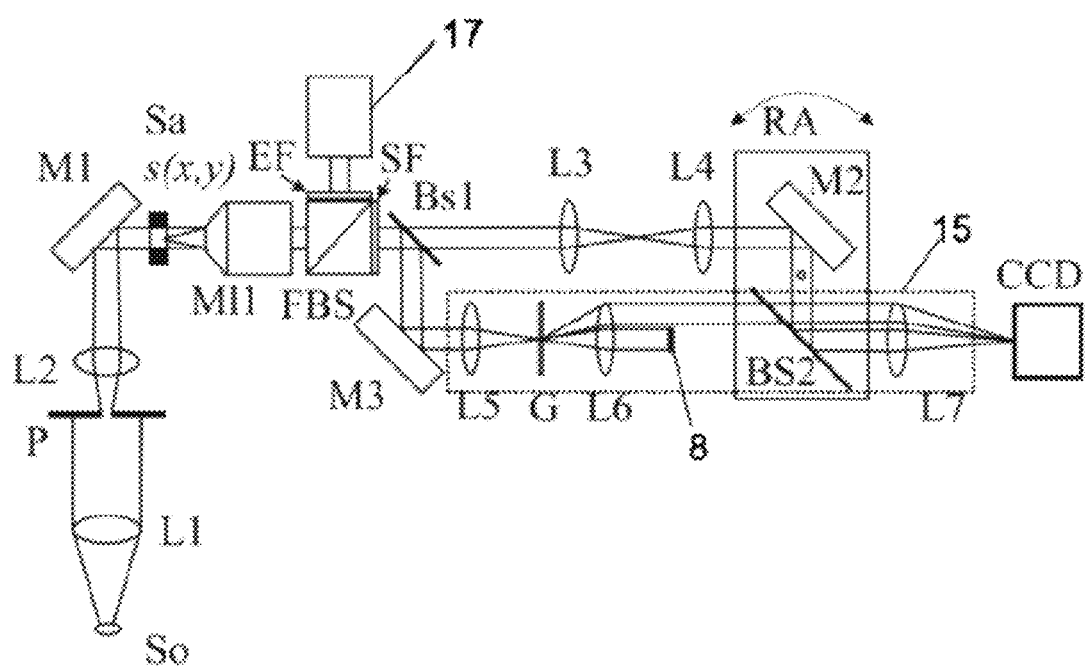
FIG. 7 represents a transmission digital holographic microscope with fluorescence capabilities comprising an interferometer according to the present invention.

Configurations including fluorescence excitation source can also be implemented as represented in FIG. 7.

As no phase shifting needs to be used, the disclosed DHM can be used for recording fast dynamical events, recording several successive frames so as to record time sequences of 3D representation of the sample to be observed.

This implementation enables the use of low cost sources, such as LEDs, and, with colour sensors, it enables the simultaneous recording of red-green-blue holograms by using three-LED illumination so as to provide full colour digital holographic microscopy without the coherent noise. Up to now, the implementation of colour digital holographic microscopy requested the use of complex recording processes. In the disclosed invention, the three colours can be recorded simultaneously.

Several types of colour sensors are commercially available, including single colour sensors such as colour CCD and triple sensor designs. In triple sensor designs, a prism block (i.e. a trichroic assembly comprising two dichroic prisms) can filter the obtained interferogram into the three primary colours, red, green, and blue, directing each colour into a separate charge-coupled device (CCD) or Active pixel sensor (CMOS image sensor) mounted to each face of the prism.

There are several types of transmission gratings that can be implemented. The simplest grating type is the Ronchi grating, which is constituted by a transparent optical plate on which parallel opaque lines of width 1 are printed. There is a constant clear spacing L between the consecutive opaque lines. Ronchi gratings often have a clear aperture width equal to the opaque one. The significant quantity that characterizes a Ronchi grating and the diffraction angle for a given wavelength is the grating period P=L+1. The diffraction analysis of a Ronchi grating is performed by first decomposing the transmittance function according to a Fourier series. For a given wavelength, each Fourier component gives rise to diffraction order characterized by a diffraction angle $\theta m$, in which m is an integer and $\theta$ is the first diffraction angle.

The diffracted amplitude in each diffraction order is proportional the corresponding Fourier component. In the interferometer of the invention 15, the grating period is selected in order to guarantee a spatial separation of the diffracted beams in the plane, where the optical stop 8 is placed.

Usually, it is one of the first diffraction orders (m=+1 or −1) that is kept for the reference beam incident on the detector. A limitation of the Ronchi grating is the spread of the light intensity among several diffraction orders thus reducing the available light for the interferometric measurements.

In order to optimize the diffraction efficiency in the diffraction order kept for the holographic process, a blazed diffraction grating can be implemented. Blazed diffraction gratings also have a periodical structure on one of the surfaces of an optical plate. In this case it is a tooth shaped relief of a surface that optimizes the diffraction efficiency in the m=1 or m=−1 diffraction orders.

In order to optimize the diffraction efficiency, it is also possible to implement thick phase holographic gratings. This type of grating is obtained by recording in a photosensitive material, for example dichromated gelatin, the interference pattern between two planes waves. Afterwards, the plate is processed and is able to mostly diffract the light in a diffraction order according to a Bragg diffraction mode. The angle between the recording plane wave determines the grating period.

The analog outputs can then be digitalised and treated by a computer so as to obtain a three-dimensional colour representation of the samples.

A partial temporal and spatial source can be constituted by a source (So), a collimating lens (L1), a pinhole (P) and a lens (L2). The temporal coherence results from the spectral width of the source (So). Typically, it can be a LED with a spectrum having a peak (for example the wavelength $\lambda$=650 nm, $\Delta\lambda$=15 nm), or a set of LEDs providing a set of peaks, to achieve colour holographic recording. The beam is collimated by the lens (L1) and is filtered by the pinhole (P) so as to increase the spatial coherence. It can be shown that the emerging spatial coherence dependency, emerging out of the lens (L2), is uniform and can be modelled by a coherence function $\gamma(x_1-x_2, y_1-y_2)$, in which $(x_1,y_1)$ and $(x_2,y_2)$ are spatial coordinates perpendicular the optical axis z.

This implementation of the partial coherent source is not restrictive and could be realized in other ways, such as with a de-correlated laser beam by a moving ground glass.

DESCRIPTION OF PREFERRED EMBODIMENTS OF THE INVENTION

Mach-Zehnder Configuration

Figure 4:
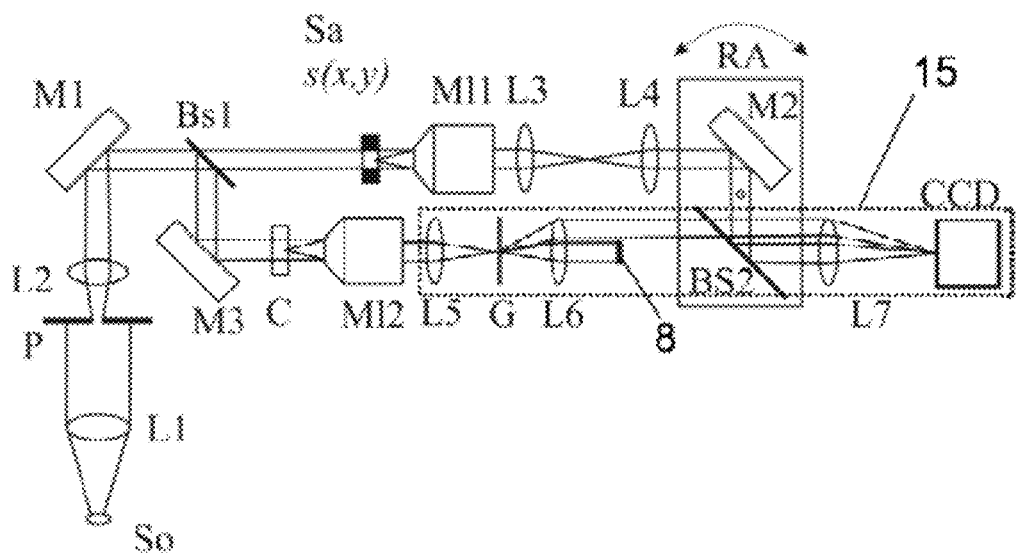
FIG. 4 represents a transmission digital holographic microscope comprising an interferometer according to the present invention.

The scheme of the digital holographic microscope based on a Mach-Zehnder configuration that enables the off-axis recording with optical sources of partial spatial and temporal coherence is depicted by FIG. 4.

In the case of FIG. 4, the light source is constituted by a source (So), a collimating lens (L1), a pinhole (P) and a lens (L2).

After a reflection by the mirror M1, the beam is split by BS1 in the object beam that illuminates the sample in transmission and the reference beam, which is redirected towards the microscope lens Ml2. The image of the front focal plane of Ml1 is performed by the set of lenses Ml1, L3, L4 and L7. For forming the image, the back focal plane of L3 is corresponding to the front focal plane of L4 and the sensor is located in the back focal plane of L7.

In this configuration, the interferometer of the invention 15 is represented by the lenses L5, L6, and L7 and the grating G.

The lenses Ml1, L3 and L4 have their counterparts in the reference arm, respectively the lenses Ml2, L5, L6, in such a way that the reference and object beams except for the sample, the grating G and the optical stop 8 are almost identical. This guarantees a proper alignment of the two beams on the sensor, where they are interfering. This is requested by the partial spatial coherent nature of the illumination.

The front focal plane of the Ml2 lens, where the optional component C that can be an optical path compensator and/or an attenuator is, is imaged on the back focal plane of L5, which also is the front focal plane of L6, where the grating G is. The role of the grating is redirecting the light by diffraction in such a way that the incident object and reference beams on L7 are spatially separated and propagating in parallel. As already demonstrated, this setup with L5, G, L6 and L7 permits maintaining the temporal coherence in the sensor plane in the case of partial temporal coherence, and producing off-axis interference.

The lens L7 superposes the objects and reference beams on the sensor with an average angle between them that originates from the grating diffraction. In this configuration, the mirror M2 is parallel to BS2 and M3 parallel to BS1. This relative orientation of the beam splitters and mirrors allows adjusting, without changing the beam positions on the sensor, the optical path by rotating the rotation assembly RA, on which the mirror M2 and the beam splitter BS2 are rigidly attached. Therefore the configuration allows to equalize the optical reference and object path beams.

Figure 5:
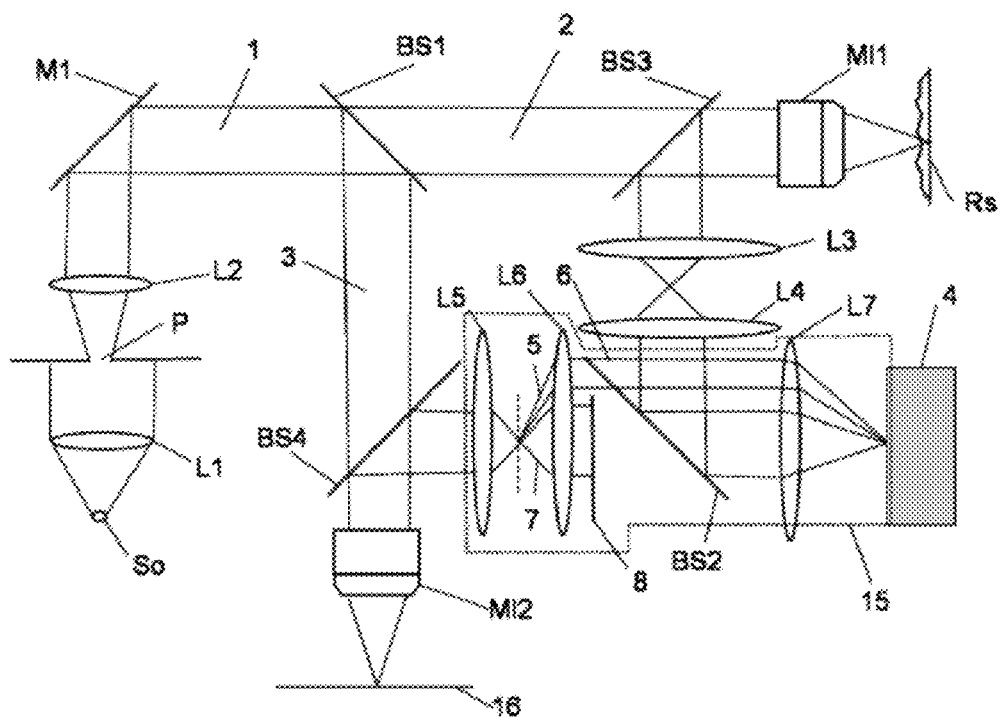
FIG. 5 represents a reflexion digital holographic microscope comprising an interferometer according to the present invention.

This configuration can be adapted to reflective samples, as represented in FIG. 5. In that case, the sample holder Sa is removed, and the mirror M2 is replaced by a third beam splitter Bs3 which illuminates a reflective sample Rs through the objective lens ML1. The light reflected by the sample and focused by the objective lens is then redirected by third beam splitter Bs3 towards the second beam splitter as in the previous configuration. The same modification is applied to the optical path of the reference beam, the sample being replaced by a reference mirror 16.

Differential Configuration

The Mach-Zehnder configuration is suitable for applications in which the optical path variations introduced by the object is limited: in the case of very fluctuating object thickness, fringe density can become too high to be recorded by the sensor.

In addition, with reduced temporal partial illumination, in the Mach-Zehnder configuration, the fine tuning of the optical path when the object is changed can be difficult. For that reason, the differential digital holographic microscope was proposed. In the latter case, it is the differential optical phase that is measured presenting the advantages of an increased dynamic range for the phase measurement and the permanent adjustment of the interferometer regardless to the sample thickness.

Figure 6:
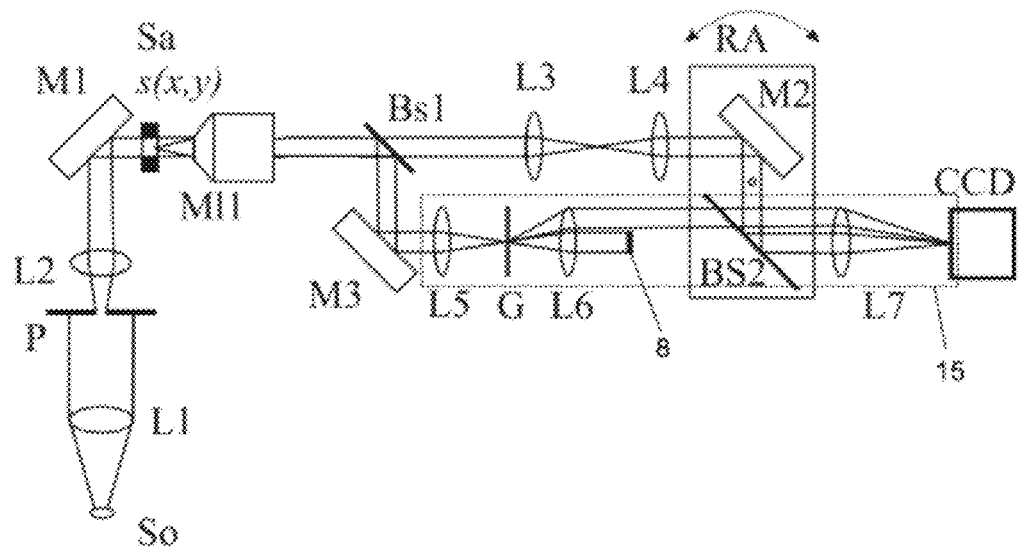
FIG. 6 represents a transmission digital holographic microscope working in differential mode, comprising an interferometer according to the present invention.

Advantageously, the off-axis configuration with partial coherent sources, spatially and temporally, can be used in differential mode. The optical scheme is represented by FIG. 6.

The partial temporal and spatial coherent source is constituted by a source (So), a collimating lens (L1), a pinhole (P) and a lens (L2). The beam is collimated by the lens (L1) and filtered by the pinhole (P) in order to increase the spatial coherence.

After a reflection by the mirror M1, the light beam illuminates the sample and is transmitted by the microscope lens Ml1. The light beam coming from Ml1 is then splitted by BS1 in two beams corresponding to a second and a third light beam. The image of the front focal plane of Ml1 located inside of the sample is performed by the set of lenses Ml1, L3, L4 and L7. For that purpose the back focal plane of L3 is in coincidence with the front focal plane of L4 and the sensor is located in the back focal plane of L7. In the same way, the image of the front focal plane of Ml1 is performed by the set of lenses Ml1, L5, L6 and L7, with the back focal plane of L3 corresponding to the front focal plane of L4. The distance between L4 and L7 is identical to the distance between L6 and L7.

Therefore, the same plane as the one of the sample plane, corresponding to the front focal plane of Ml1, is imaged on the CCD sensor. A shift is introduced between the images formed by the second and third light beams by slightly rotating the mirror M2 or the mirror M3. It is a shift of merely a few pixels, or even less than a pixel on the CCD sensor. The counterparts of the lenses L3 and L4 of the first optical channel 1, respectively the lenses L5, L6, are situated in the optical path of the third light beam in such a way that optical path of both second and third light beams, except for the sample, the grating G and the optical stop 8 are identical. This permits a proper alignment with the small shift of the two channels on the sensor where they are interfering.

The front focal plane of the Ml1 lens is imaged on the back focal plane of L5, which also is the front focal plane of L6, where the grating G is. The role of the grating is to redirect the light by diffraction in such a way that the incident beams of the two channels on L7 are spatially separated. The lens L7 superposes the two beams on the sensor with an average angle between them that originates from the grating diffraction. In the configuration, the mirror M2 is almost parallel to BS2 and M3 to BS1. These relative orientations of the beam splitters and mirrors allow adjusting, without changing the beam positions on the sensor, the optical path by rotating the rotation assembly RA on which the mirror M2 and the beam splitter BS2 are rigidly attached. Therefore the configuration allows equalizing the optical reference and object path beams.

The average angle between the object and the reference beam on the sensor provides the off-axis configuration. As was already demonstrated, there is a proper alignment, even in the case of a partial temporal coherence source, in order to homogeneously provide contrasted fringe pattern over the whole CCD sensor. It has to be noted that an attenuator can be placed in the optical path of the second light beam to compensate for the light loss originating from the grating. A transparent optical plate can be inserted in the optical path of the third light beam so as to compensate for the optical path difference introduced between the two channels by the attenuator.

A fluorescence source 17 can be used when the sample of interest is fluorescent as represented in FIG. 7. Its beam is reflected by the fluorescent beam splitter through the lens Ml1 to illuminate the sample. The back propagating fluorescent signal is transmitted by Ml1 and spectrally filtered by SF in order to remove the fluorescent excitation part before to be incident on BS1. As the lens Ml1 is limited by an aperture, the incoherent fluorescent signal is of partial spatial coherence when it emerges from Ml1, the result being that the two beams are able to interfere as long as the shift is smaller than that of the spatial coherence length.

The present invention is also described in details in the priority EP application having number 09172561.4, the disclosure of which is hereby fully incorporated herein by reference.

The invention claimed is:

1. An off-axis digital holographic microscope comprising:
   a spatially and temporally partially coherent light source arranged to produce a first partially coherent light beam;
   a recording plane;
   a microscope objective having a front focal plane;
   an object cell able to hold a specimen to be studied located in the front focal plane of said microscope objective; said object cell being optically conjugated with said recording plane;
   a grating located in a plane optically conjugated with said recording plane, said grating defining a first optical path and a second optical path, said optical paths corresponding to different diffraction orders;
   a first lens, said grating being located in the back focal plane of said first lens;
   a second lens having a front focal plane, the grating being located in the front focal plane of said second lens; and
   a third lens having a back focal plane and being optically coupled to said second lens, said recording plane being located in the back focal plane of said third lens;
   wherein temporal coherence and spatial coherence between light beams following said first and second optical paths are maintained on an entirety of the recording plane.

2. Digital holographic microscope according to claim 1, wherein the object cell is illuminated by the first light beam, said microscope objective being located in front of the interferometer and wherein a wedge is located in the second optical path of said interferometer for producing a differential hologram.

3. Digital holographic microscope according to claim 2 wherein the partially coherent light source comprises illumination means selected from the group consisting of a light emitting diode (LED), a gas discharge lamp, thermal sources and pulsed laser.

4. Digital holographic microscope according to claim 1 wherein said recording means are color sensitive recording means, and the light source simultaneously produces at least three separate wavelengths, for recording color holographic interferogram.

5. Digital holographic microscope according to claim 4 wherein said light source comprises at least three LEDs of different wavelengths.

6. Digital holographic microscope according to claim 4 wherein the separate wavelengths correspond to Cyan Magenta and Yellow (CMY) or Red Green Blue (RGB) for color reconstruction.

7. Digital holographic microscope according to claim 1 comprising a fluorescence excitation source optically coupled to said sample holder.

8. An off-axis digital holographic microscope comprising:
   a spatially and temporally partially coherent light source arranged to produce a first partially coherent light beam;
   a recording plane;
   a microscope objective having a front focal plane;
   an object cell able to hold a specimen to be studied located in the front focal plane of said microscope objective, and said object cell being optically conjugated with said recording plane;
   a grating located in a plane optically conjugated with said recording plane;
   a Mach-Zehnder interferometer comprising a first beam splitter and a second beam splitter, said first beam splitter being able to split said first light beam into a second light beam and a third light beam;
   a first lens, located in the optical path of said third light beam, for focusing said third light beam on said grating;
   a second lens having the same optical axis as the first lens and located at focal distance of the grating for producing at least one non-zero order diffracted light beam, and said second beam splitter being arranged for recombining said second light beam and said diffracted light beam into a recombined beam;
   an optical stop for stopping the zero order diffracted light of said third light beam;
   recording means arranged for recording interferometric signals produced by the interaction between the second light beam and the diffracted light beam, said recording means being located in the recording plane of said interferometer;
   focusing means for focusing said recombined beam onto said recording-means; and
   the optical pathway of the second light beam and the third light beam being essentially equivalent.

9. Digital holographic microscope according to claim 8 wherein the object cell and the microscope objective are located in front of the first beam splitter, defining a differential holographic configuration.

10. Digital holographic microscope according to claim 8 wherein the object cell and the microscope objective are located in the optical path of the second light beam.

11. Digital holographic microscope according to claim 10 wherein a second microscope objective is located in the optical path of the third light beam.

12. Digital holographic microscope according to claim 8 further comprising a third beam splitter located on the second light beam pathway for illuminating a reflecting object and a fourth beam splitter located on the third light beam pathway for illuminating a reference mirror, defining a Mach-Zehnder geometry.

13. Method for producing a fringe contrast between two non-parallel temporally partially coherent light beams, said method comprising the steps of:
   providing an incident light beam, said incident light beam being temporally partially coherent;
   focusing said incident light beam on a grating for producing at least two diffracted light beams;
   focusing said diffracted light beams to infinite for obtaining parallel diffracted light beams parallel to the incident light beam;
   focusing said parallel diffracted light beams on a recording plane, producing fringe contrast independent of the position in the recording plane, temporal coherence and spatial coherence of said parallel diffracted light beams being maintained on said recording plane.

14. Method for recording off-axis digital holograms comprising the steps of:
   providing a partially coherent light source producing a first partially coherent light beam;
   splitting the first partially coherent light beam into a second light beam and a third light beam;
   focusing the third light beam on a grating for splitting said third light beam into a non-zero order diffracted light beam and a zero order diffracted light beam;
   focusing the non-zero order diffracted light beam and zero order diffracted light beam to infinite in order to obtain parallel and spatially separated non-zero diffracted light beam and zero order diffracted light beam;

stopping the zero order diffracted light beam;
combining the non-zero order diffracted light beam with the second light beam into a recombined beam;
focusing the recombined beam on recording means to obtain an off-axis interferogram; temporal coherence and spatial coherence of the non-zero order light beam and the second light beam being maintained on the recording means.

* * * * *